United States Patent
Spektor et al.

(10) Patent No.: US 10,671,381 B2
(45) Date of Patent: Jun. 2, 2020

(54) CONTINUOUS INTEGRATION WITH REUSABLE CONTEXT AWARE JOBS

(71) Applicant: Hewlett Packard Enterprise Development LP, Houston, TX (US)

(72) Inventors: Adam Spektor, Yehud (IL); Nathan Grunzweig, Yehud (IL); Lena Feygin, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 104 days.

(21) Appl. No.: 15/113,541

(22) PCT Filed: Jan. 27, 2014

(86) PCT No.: PCT/US2014/013113
§ 371 (c)(1),
(2) Date: Jul. 22, 2016

(87) PCT Pub. No.: WO2015/112170
PCT Pub. Date: Jul. 30, 2015

(65) Prior Publication Data
US 2017/0010889 A1    Jan. 12, 2017

(51) Int. Cl.
G06F 9/44 (2018.01)
G06F 9/45 (2006.01)
G06F 8/71 (2018.01)
G06F 11/08 (2006.01)
G06F 11/36 (2006.01)

(52) U.S. Cl.
CPC .............. *G06F 8/71* (2013.01); *G06F 11/08* (2013.01); *G06F 11/36* (2013.01); *G06F 11/3668* (2013.01)

(58) Field of Classification Search
CPC . G06F 8/71; G06F 11/08; G06F 11/36; G06F 11/3668
See application file for complete search history.

(56) References Cited

U.S. PATENT DOCUMENTS

| | | | | |
|---|---|---|---|---|
| 7,237,225 B2* | 6/2007 | Kompalli | .................. | G06F 8/20 717/108 |
| 8,677,315 B1* | 3/2014 | Anderson | ................. | G06F 8/60 717/101 |
| 9,021,458 B1* | 4/2015 | Jacob | ........................ | G06F 8/65 717/168 |
| 9,329,937 B1* | 5/2016 | Grant | ...................... | G06F 11/14 |
| 9,430,229 B1* | 8/2016 | Van Zijst | ............. | G06F 9/3844 |
| 9,569,204 B2* | 2/2017 | Mansour | ................. | G06F 8/447 |

(Continued)

OTHER PUBLICATIONS

Hannah Inman, Continuous Integration to Continous Deployment with Jenkins and Deployit, 2012. https://www.cloudbees.com/blog/using-jenkins-templates-plugin-construct-reusable-jobs-and-builders.*

(Continued)

*Primary Examiner* — Mongbao Nguyen

(57) ABSTRACT

A method includes accessing a build pipeline that includes multiple jobs that are reusable and configurable. The method includes retrieving a version of code for a software application, where the version of code is related to a context. The method includes configuring the jobs of the build pipeline according to the context. The method includes testing the version of code using the build pipeline with the configured jobs.

16 Claims, 4 Drawing Sheets

(56) References Cited

U.S. PATENT DOCUMENTS

| | | | | |
|---|---|---|---|---|
| 2006/0129652 A1* | 6/2006 | Petrovskaya | ............ | G06F 9/46 709/208 |
| 2010/0083211 A1* | 4/2010 | Poole | ................ | G06F 8/71 717/101 |
| 2010/0281461 A1* | 11/2010 | Tyler | .................. | G06F 8/41 717/106 |
| 2010/0318649 A1* | 12/2010 | Moore | .................... | G06F 11/30 709/224 |
| 2012/0144239 A1 | 6/2012 | Moore, Jr. et al. | | |
| 2012/0180024 A1 | 7/2012 | Gonzalez et al. | | |
| 2013/0139127 A1 | 5/2013 | Vecera et al. | | |
| 2013/0152047 A1* | 6/2013 | Moorthi | ............ | G06F 11/3688 717/124 |
| 2013/0174117 A1 | 7/2013 | Watters et al. | | |
| 2013/0227573 A1* | 8/2013 | Morsi | .................. | G06F 9/5083 718/100 |
| 2014/0075413 A1* | 3/2014 | Binjrajka | ................ | G06F 8/71 717/121 |
| 2014/0149966 A1* | 5/2014 | Binjrajka | ................ | G06F 8/72 717/121 |
| 2014/0282353 A1* | 9/2014 | Jubran | .................... | G06F 8/00 717/101 |
| 2014/0282421 A1* | 9/2014 | Jubran | ................ | G06F 11/3664 717/126 |
| 2015/0026121 A1* | 1/2015 | Shani | .................. | G06F 11/3688 707/609 |
| 2015/0067404 A1* | 3/2015 | Eilam | ................ | G06F 11/3006 714/38.1 |
| 2015/0095619 A1* | 4/2015 | Dubey | ................ | G06F 11/3688 712/216 |
| 2015/0106790 A1* | 4/2015 | Bigwood | ............ | G06F 11/3624 717/127 |
| 2015/0135158 A1* | 5/2015 | Tenev | ................ | G06F 11/3684 717/101 |
| 2015/0199247 A1* | 7/2015 | Sangani | ............ | G06F 11/3672 714/46 |

OTHER PUBLICATIONS

Stephen Connolly, Controlling What You See (with the View Job Filters Jenkins Plugin), 2012, pp. 1-13. https://www.cloudbees.com/blog/controlling-what-you-see-view-job-filters-jenkins-plugin.*
Harpreet, Using Jenkins Templates Plugin to Construct Reusable Jobs and Builder, 2012. https://www.cloudbees.com/blog/using-jenkins-templates-plugin-construct-reusable-jobs-and-builders.*
Jez Humble, Continuous Delivery, 2011, pp. 22-91 http://www.synchronit.com (Year: 2011).*
Larry Brader, Microsoft, Building a Release Pipeline with Team Foundation Server 2012, pp. 15-80 (Year: 2012).*
Fazreil Amreen Abdul, Implementing Continuous Integration towards Rapid Application Development, 2012, pp. 118-123. https://ieeexplore.ieee.org/stamp/stamp.jsp?tp=&arnumber=6236372 (Year: 2012).*
Yongchang Ren, Software Configuration Management of Version Control Study Based on Baseline, 2010, pp. 118-121. https://ieeexplore.ieee.org/stamp/stamp.jsp?tp=&arnumber=5694861 (Year: 2012).*
Martin Fowler, Continuous Integration, 2006, pp. 1-12. https://martinfowler.com/articles/continuousIntegration.html (Year: 2006).*
Fazreil Amreen Abdul, Implementing Continuous Integration towards Rapid Application Development, p. 1-6, 2012. https://ieeexplore.ieee.org/stamp/stamp.jsp?tp=&arnumber=6236372 (Year: 2012).*
Move to Continuous Integration on the Cloudk, (Research Paper), May 2, 2013, 111 Pages.
Amok Time, Automatic, Opt-In Branch Building With Jenkins and git, Oct. 11, 2011, 9 Pages.
Force Stable Trunk/master Branch, (Web Page), Jul. 16, 2013, Retrieved Feb. 18, 2014, 3 Pages, http://stackoverflow.com/questions/17524869/force-stable-trunk-master-branch.
Goff-Dupont, S, Story Branching and Continuous Integration: a Swords-to-plowshares Tale, (Web Page), Jul. 30, 2012, Retrieved Feb. 18, 2014, 3 Pages, https://blogs atlassian com/2012/07/feature-branching-continuous-integrationgit-bamboo/.
International Searching Authority, The International Search Report and Written Opinion, dated Mar. 31, 2015, 9 pgs.
James, Making Feature Branches Effective With Continuous Integration, Apr. 2, 2012, 6 Pages.
Kevin Kane, DynamicAxis Plugin, Oct. 30, 2013, 3 Pages.
Larry Fast, Building A Matrix Project, May 22, 2013, 2 Pages.
Maria Khalusova et al, TeamCity Working With Feature Branches, Apr. 29, 2013, 7 Pages.
Singleton, A., Unblock! a Guide to the New Continuous Agile, (Research Paper), Oct. 22, 2013, 195 Pages.

* cited by examiner

CONTINUOUS INTEGRATION WITH REUSABLE CONTEXT AWARE JOBS

BACKGROUND

Continuous integration (CI) is the practice, in software development, of merging several developer working copies of code into a snared source code location several times a day and running automated processes to test the quality and functionality of the code. Developers may, at various times, "commit" their working copies of code to the shared source code location; for example, a version control system. Then, at various times, a continuous integration tool may pull the latest merged version of the code from the version control system and run various tests on the code.

BRIEF DESCRIPTION OF THE DRAWINGS

The following detailed description references the drawings, wherein.

DETAILED DESCRIPTION

Figure 1:
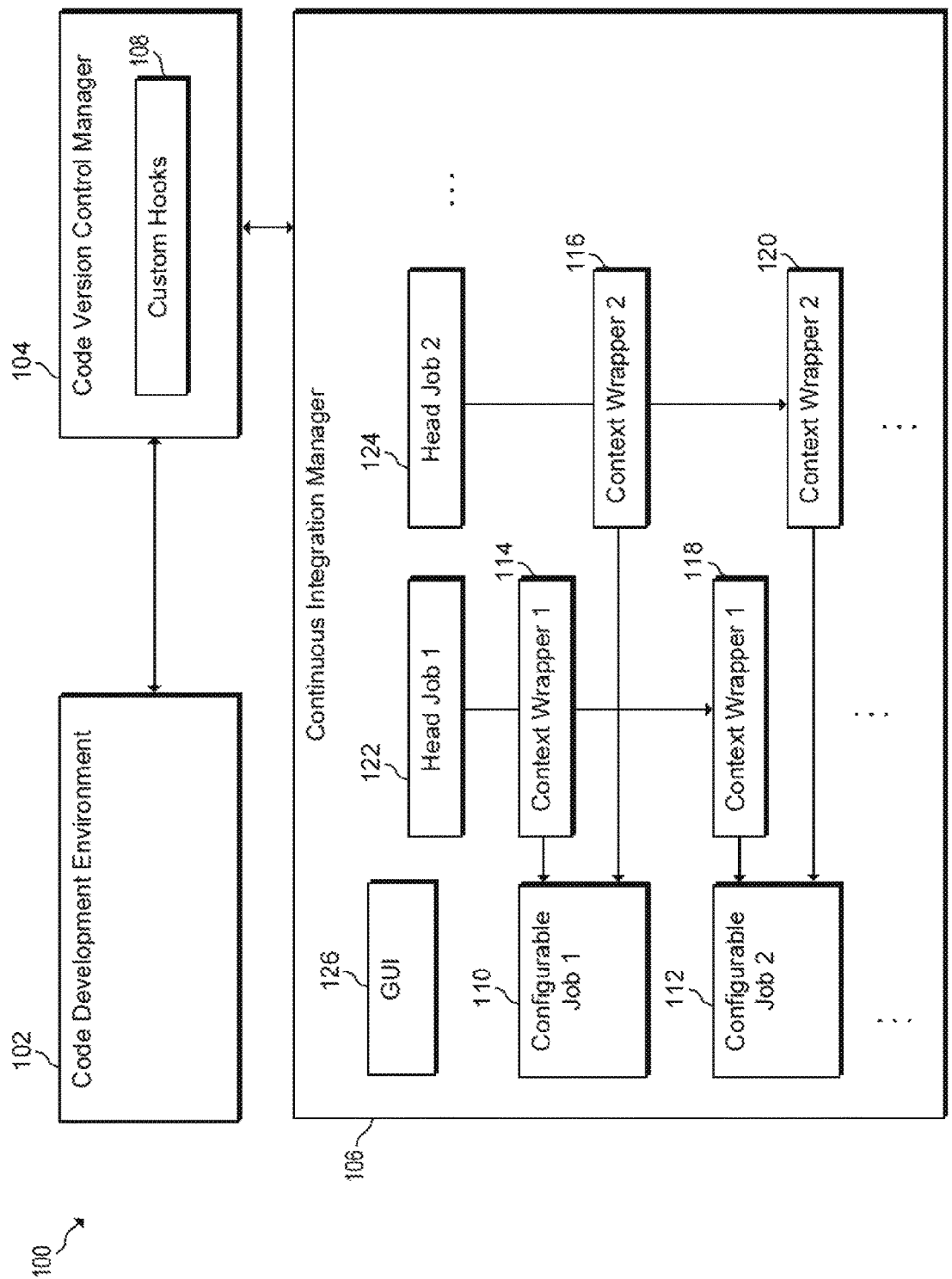
FIG. 1 is a block diagram of an example computing environment in which: continuous integration with reusable context aware jobs may be useful.

As mentioned above, developers may, at various times, "commit." or push their working copies of code to a version control system. One example version control system is called "Git". The latest merged version of the code in the version control system may be referred to as the "trunk" or the "master" branch. The trunk may be the base of a project; and developers may make subsequent developments to the project using the trunk as a starting point. The trunk may generally contain the latest cutting-edge version of the project, but for this reason, it may also be the most unstable version if all developers are committing potentially insufficiently tested code to be merged with the trunk. When many developers are working on the same project and are all committing changes to the trunk, the trunk can get "dirty" (due to bad commits). Thus, in some situations, it may be very problematic for developers to work together. Even if all of the developers cooperate and commit code that is free of errors, it may not be feasible for all developers to run all the tests they should before every code push, and there may be hundreds of code pushes per day. Thus, it may be desirable to keep the trunk source code clear of uncompleted or untested features and bug fixes, so these will not block the progress or other developers in the team. Additionally, it may be desirable to allow developers to run a full CI cycle to test their working code before committing their changes to the version control system.

As mentioned above, at various times, a continuous integration (CI) tool may pull the latest merged version of the code from the version control system and run various tests on the code. One example continuous integration tool is called Jenkins. The continuous integration tool may implement a series of steps or "jobs", all of which may be used to bring a project from source code to deployment to customers. This series of steps may be referred to as a "pipeline," and example steps may include compiling the source code, security testing, validation testing, performance testing, integration testing, unit testing, documentation and deployment. Creating such a pipeline n be a long, complex process. Thus, it may be desirable to minimize any duplication in any of the steps of the pipeline.

In some development approaches, developers may split "branches" off the trunk, where each branch is a copy of the latest merged and tested version of the code. Developers may then implement subsequent changes in their particular branches and then merge the changes back into the trunk when their branches have proven to be stable and working. For such approaches, in order for developers to run a full CI cycle to test their working code, they may have to copy the above mentioned pipeline for every branch that is split off the trunk. Such duplication of the pipeline (i.e., pipeline steps) may be inefficient and unsustainable for projects that require many branches. For example, it may take a high amount of effort to maintain all the copies of the pipeline. For example, a pipeline template may have to be maintained, and when a change is made to a step of the pipeline, the change may have to be propagated to every copy of the pipeline.

The present disclosure describes continuous integration with reusable context aware jobs. The present disclosure describes using a single generic pipeline that can be used for all branches off a trunk of a project and/or for multiple different applications. The single generic pipeline may include multiple reusable and configurable jobs. The pipeline/jobs may be configured to be context aware for example, by wrapping the jobs with context wrappers. The pipeline jobs may be configured by head jobs, for example, one head job per context (e.g., per branch and/or per application). Such head jobs may be automatically created by custom hooks of a version control system. The present disclosure allows developers and teams to work on and test their branches, for example, and get feedback from a complete CI cycle for their particular branch. Furthermore, because a single pipeline is used, pipeline steps are not duplicated. Thus, all the best practices may be implemented in the one pipeline, and when a step or job of the pipeline is updated, the change is instantly ready to be used for all branches and or applications using the pipeline.

In the present disclosure; to term "context" may refer to a particular branch off the trunk or a particular application. Various descriptions herein may describe features using a particular branch context as an example. It should be understood however, that the present disclosure also contemplates using a single generic pipeline for multiple different software applications (e.g., Java apps). As long as the different applications all conform to certain standards, they may use the same pipeline. The standards may allow the different applications to be tested using the same jobs of the pipeline where the jobs are configured for the particular application.

FIG. 1 is a block diagram of an example computing environment 100 in which continuous integration with reusable context aware jobs may be useful. Computing environment 100 may include at least one code development environment (e.g., 102), a code version control manager 104 and a continuous integration manager 106. It should be understood that although FIG. 1 and various descriptions herein may indicate only a single code development environment (e.g., 102), more than one code development environment may be in communication with code version control manager 104, and these additional code development environments may be similar to code development environment 102. The components (e.g., 102, 104, 106) of computing environment 100 may each be in communication with at least one of the other components, for example, as indicated by arrows in FIG. 1. These communications may be performed over at least one network, for example, any wired or wireless network. Each network may include any number of hubs, routers, switches or the like. Each network may be, for example, part of the internet, part of an intranet and/or other type of network. The network that allows for communication between two components (e.g., 102, 104) of environment 100 may be the same or a different network than the network that allows for communication between two other components (e.g., 104, 106).

Computing environment 100 may generally depict an environment used in a code development process (e.g., for a software application). For example, an application developer may communicate with code development environment 102 to pull a version of code for an application from code version control manager 104. Code development environment 102 may also indicate to code version control, manager 104 that this particular pulled version of code is a "branch" off the trunk code for the application. The developer may then communicate with code development environment 102 to modify the pulled code as a working copy of code for the application. Code development environment 102 and/or code version control manager 104 may track that this particular working copy of code is for a particular branch off the trunk. Via code development environment 102, the developer may eventually commit the working copy of the code to code version control manager 104. Once fully tested, the working copy of code may be merged with the trunk code to create a new single merged trunk. Alternatively, the trunk code may be merged with the branch code, and once that code is tested, it may be merged back with the trunk.

To fully test the committed branch code, continuous integration manager 106 may pull the branch code from code version control manager 104 and may build the code and run tests (e.g., integration tests) on the code. According to the present disclosure, such tests may be run as part of a pipeline as described above, where the pipeline may be configured for the particular branch. Accordingly, continuous integration manage 106 may also track that this particular code to be tested is for a particular context (e.g., a particular branch off the trunk). More particularly, continuous integration manager 106 may use reusable jobs of a single pipeline for the testing where each job is configured for the particular branch.

Code development environment 102 may be an integrated development environment (IDE) or interactive development environment that provides comprehensive functionality to developers to write code for software applications. Code development environment 102 may provide a developer with at least one graphical user interface (GUI) that allows the developer to create and modify code. Such a GUI may provide to the developer access to various code files that are part of a project (e.g. for an application). Such a GUI may allow the developer month the various code files of the project.

Code development environment 102 may be included within a ode development system, which may be any computing device that is capable of communicating with a code version control manager (e.g., 104) over a network. Code development environment 102 may include a series of instructions encoded on a machine-readable storage medium of such a code development system, where the instructions are executable by a processor of the code development system. In addition or as an alternative, code development environment 102 may include one or more hardware devices including electronic circuitry for implementing the functionality of the code development environment 102.

Code version control manager 104 may track various versions of source code (e.g., for a software application) and may provide control over changes to that source code. Code version control manager 104 may receive committed copies of code from various code development environments (e.g., 102), and may determine whether any conflicts exist. Code version control manager 104 may, at various times, merge multiple received committed copies of code into a new merged version of the source code, e.g., to create a new master version of the source code (i.e., the trunk). Code version control manager 104 may track various branches off the trunk, and may require that each branch be fully CI tested before it is merged with the trunk.

Code version control manager 104 may be included within a code version control system, which may be any computing device that is capable of communicating with at least one code development environment (e.g., 102) over a network. Code version control manager 104 may include a series of instructions encoded on a machine-readable storage medium of such a code version control system, where the instructions are executable by a processor of the code version control system. In addition or as an alternative, code version control manager 104 may include one or more hardware devices including electronic circuitry for implementing the functionality of the code version control manager 104.

Code version control manager 104 may include a number of custom hooks or scripts, generally represented by reference number 108. Alternatively, custom hooks 108 may be stored alongside code version control manager 104 (e.g., in the same system) and may be accessible by code version control manager 104. As one specific example, in a Git version control manager, such custom hooks may be referred to as "Git hooks." According to this disclosure, a custom hook is a custom or user-defined script that may be run or launched by a code version control manager (e.g., 104) when certain important events occur. Thus custom hooks 108 may be run by code version control manager 104 when certain events occur (e.g., events that are detected by code version control manager 104).

Custom hooks 108 may allow for automation in the continuous integration approach of the present disclosure. For example, when a developer pushes or commits a working copy of code (e.g., for a particular branch) to code version control manager 104, code version control manager may detect such a code push as an important event, and may launch at least one custom hook in response. Then, at least one of the launched custom hooks may interact with continuous integration manager 106. For example, as described in more detail below, a custom hook may indicate to continuous integration manager 106 that it should create a new "head" job.

Continuous integration manager 106 may pull code from code version control manager 104, for example, continuous integration manager 106 may pull the trunk code or any branches off the trunk. Continuous integration manager 106 may compile and build the pulled code, e.g., automatically after the code is received. Continuous integration manager 106 may run various tests on the compiled and built code to check whether any of the code is broken or not functioning properly or optimally. Continuous integration manager 106 may automatically run such tests after the code is compiled and built. In some examples, continuous integration manager 106 may be a CI agent such as Jenkins.

Continuous integration manager 106 may be included within a code integration system, which may be any computing device that is capable of communicating with at least one code version control manager (e.g., 104) over a network. Continuous integration manager 106 may de a series of instructions encoded on a machine-readable storage medium of such a code integration system, where the instructions are executable by a processor of the code integration system. In addition or as an alternative, continuous integration manager 106 may include one or more hardware devices including electronic circuitry for implementing the functionality of the continuous integration manager 106.

Continuous integration manager 106 may implement a "pipeline" to test code. The general concept of a pipeline is described above. As described; a pipeline may include multiple steps or "jobs." According to the present disclosure, one generic pipeline may be used to test multiple branches off the trunk, and even may be used to test multiple different applications. The one generic pipeline may include a number of generic configurable jobs, for example, as shown in FIG. 1, configurable job 110 and configurable job 112. Each configurable job may include generic information related to a routine, whether that routine is related to compiling the code, security testing, performance testing, etc. Once configured, the configurable job may cause continuous integration manager 106 to perform the routine in a manner that is adapted to a particular context or situation.

Continuous integration manager 106 may configure each configurable job for a particular context. For example, such context may be that the pipeline is being implemented for a particular branch and/or that the pipeline is being implemented for a particular application. Thus, because the configurable jobs of the pipeline may be configured for a particular context, the pipeline may be said to be context aware (e.g., branch aware and/or application aware). Additionally, because a single configurable pipeline may be used, the pipeline does not have to be duplicated for various branches and applications, as is the case with other continuous integration approaches.

The following will describe generally what it means for a pipeline to be context aware, specifically, "branch aware." Suppose that two different branches (a first branch and a second branch) exist off the same trunk. Then, assume that each of the branches is being tested using the same single pipeline. Further, assume that for a particular test (e.g., a job of the pipeline); the first branch fails the test and the second branch passes the test. If the pipeline was not branch aware, it may appear to continuous integration manager 106 that the second branch fixed the issue that existed with the first run through the pipeline (the first branch). In reality, however, these two branches are different working copies of code, and the problem in the first branch may not be fixed. Thus, by being branch aware, a pipeline may be used to test a particular branch in isolation, without influence from tests for a different branch.

Continuous integration manager 106 may configure each configurable job by "wrapping" the job in a context wrapper. For example, in the example of FIG. 1, configurable job 110 may be wrapped in context wrapper 114 in one particular situation, and may be wrapped in context wrapper 116 in another situation. Likewise, configurable job 112 may be wrapped in context wrapper 118 in one particular situation, and may be wrapped in context wrapper 120 in another situation. Each context wrapper may provide certain parameters to the configurable job to configure the job. Various context wrappers may be related to the same context or situation. For example, context wrapper 114 and 118 may be related to the same context or situation. Likewise, context wrapper 114 and 118 may be related to the same context or situation.

One specific way to implement these context wrappers is to use what are called "matrix jobs." A matrix job may refer to a feature of a continuous integration manager (e.g., 106) that allows an administrator to duplicate jobs with various configurations. Additionally, a continuous integration manager (e.g., 106) may provide a feature (e.g., dynamic axis plugins) that allows environment variables to be contributed to the build from various places. Thus, in this specific example, a matrix of size 1×1 may be created, where the matrix "wraps" a configurable job. The inner configurable job may be generated dynamically for a particular context (e.g., branch or application). The inner job may be generated with the generic information of the job and may be configured according, to the particular circular particular context. It should be understood that although the preceding describes one configure the jobs of a pipeline, this disclosure contemplates other manners of configuration as well.

Continuous integration manager 106, with its ability to configure jobs, provides benefits over various other continuous integration approaches, for example, those that have no concept of branch. For these other approaches, a continuous integration manager only has a concept of jobs that trigger one another, and no concept of branches. As one example disadvantage of these other approaches, the history logs and/or statistics tools of the continuous integration manager may show information for jobs that are run for all branches. Additionally, any emails or messages that are sent (e.g., indicating that a test has passed or failed) may, be sent to all developers that are associated with a particular job, without consideration of which branch was tested. Such disadvantages make it hard for developers to understand the execution of a pipeline flow as it pertains to their branches.

Continuous integration manager 106 may use "head" jobs to configure the configurable jobs of the single pipeline. For example, one head job may be used for each context (e.g., for each branch and/or for each application). In the example of FIG. 1, head job 122 may configure the configurable jobs (e.g., 110, 112) of the pipeline for a first context and head job 124 may configure the configurable jobs of the pipeline for a second context. A head job may be a job of a continuous integration manager that is similar to jobs that are part of a pipeline, but a head job may be particularly suited for configuring other jobs. Each head job may include various parameters or pieces of metadata that can be used to configure jobs, where such parameters # metadata are specific to the particular context.

Continuous integration manager 106 may create new head jobs when continuous integration manager 106 needs to track a new context (e.g., a new branch or a new application). Continuous integration manager 106 may, for example, create a new head job in response to a signal received from code version control manager, specifically, from a custom hook (108). In this respect, the creation of new head jobs may be automated, for example, because custom hooks may be automatically run when code version control manager 104 detects certain events (e.g., the creation of a new branch). When such a custom hook creates a new head job, the custom hook may provide certain metadata, or parameters to the head job. Such metadata parameters may include the repository where certain branch code is stored and/or various other pieces of information that can be used to configure jobs of the pipeline. Then, the created head job may pull code from the indicated repository and configure all the jobs of the pipeline, as described above. The created head job may also trigger the main pipeline.

Continuous integration manager 106 may send email notifications or other messages in a context-aware manner. Such emails/messages may notify developers of various events such as failed tests. If continuous integration manager 106 did not send emails/messages in a context-aware manner, developers may get bombarded by emails/messages from tests of various jobs that are run for various contexts (e.g., branches and/or applications) that are not relevant to the developer. By tracking the context, developers only receive emails/messages for the branches or applications that they are working on and that they committed.

Continuous integration manager 106 may use head jobs (e.g., 122, 124) to send these context-aware emails/messages. With various other continuous integration approaches, the individual jobs may send emails/messages. According to the present disclosure, head jobs include various pieces of configuration information that allow the head job to send emails/messages in a context-aware manner. For example, when a custom hook (108) is used to create a head job, the custom hook may also provide contact information for developers that are associated with a particular context (e.g., branch and/or application), and thus the head job may have access to this information, which it may use to send context aware emails/messages.

In some examples, the emails/messages sent by the head jobs may include information about the pipeline, e.g., as it pertains to the particular context of the head job. Thus, users can easily understand the flow of the pipeline, in isolation (e.g., as it pertains to their context, without seeing information about other contexts). In some examples, the emails/messages may include an embedded pipeline tree that is context aware, for example, displayed as an image, tree hierarchy or the like. In these examples, such emails/messages may clearly show the steps of the pipeline, and may show which steps passed, which steps failed, and the like, all isolated for the particular context. In some specific examples, the emails/messages may include a pipeline presentation that looks similar to a Jenkins report.

Continuous integration manager 106 may include a graphical user interface (GUI) 126 that is context-aware. GUI 126 may provide users (e.g., developers) with the status of the pipeline, e.g., various jobs or tests of the pipeline. If continuous integration manager 106 did not include a context-aware GUI, users may see status information for jobs for all contexts (e.g., branches and/or applications), even contexts that are not relevant to the user. By tracking the context, users can see only information for branches and/or applications that they are working on. Thus, GUI 126 allows a user to see the status of the pipeline specific to the users context, and thus users can easily understand the pipeline for their context. Furthermore, other contexts may be hidden from the user, which reduces information that is not important to the user. Additionally, the GUI may hide the fact that a context wrapper (e.g., 114, 116, 118, 120) was used. For example, the GUI may hide the matrix shell used to configure the jobs of the pipeline for the particular context, in one specific example, the GUI may be updated dynamically (e.g., using groovy, JavaScript and/or the like). Such dynamic updating may be done without having to restart the GUI 126 or the continuous integration manager 106.

Continuous integration manager 106 may generate build history in a context-aware manner. Such a build history may indicate which tests of a pipeline passed, which failed, and other information that may be used to investigate how the pipeline executed, e.g., the username of the person responsible for triggering the build. If continuous integration manager 106 did not generate build history in a context-aware manner, users (e.g., developers), when viewing the build history may see pipeline test results from various contexts (e.g., branches and/or applications), even contexts that are not relevant to the developer. By tracking the context, users only see build history for the branches or applications that they are working on. Continuous integration manager 106 may also allow a build history to be filtered based on context. For example, build histories for all contexts may be shown in one state, and then a user may select an option to filter and show only build history for a chosen context.

Figure 2:
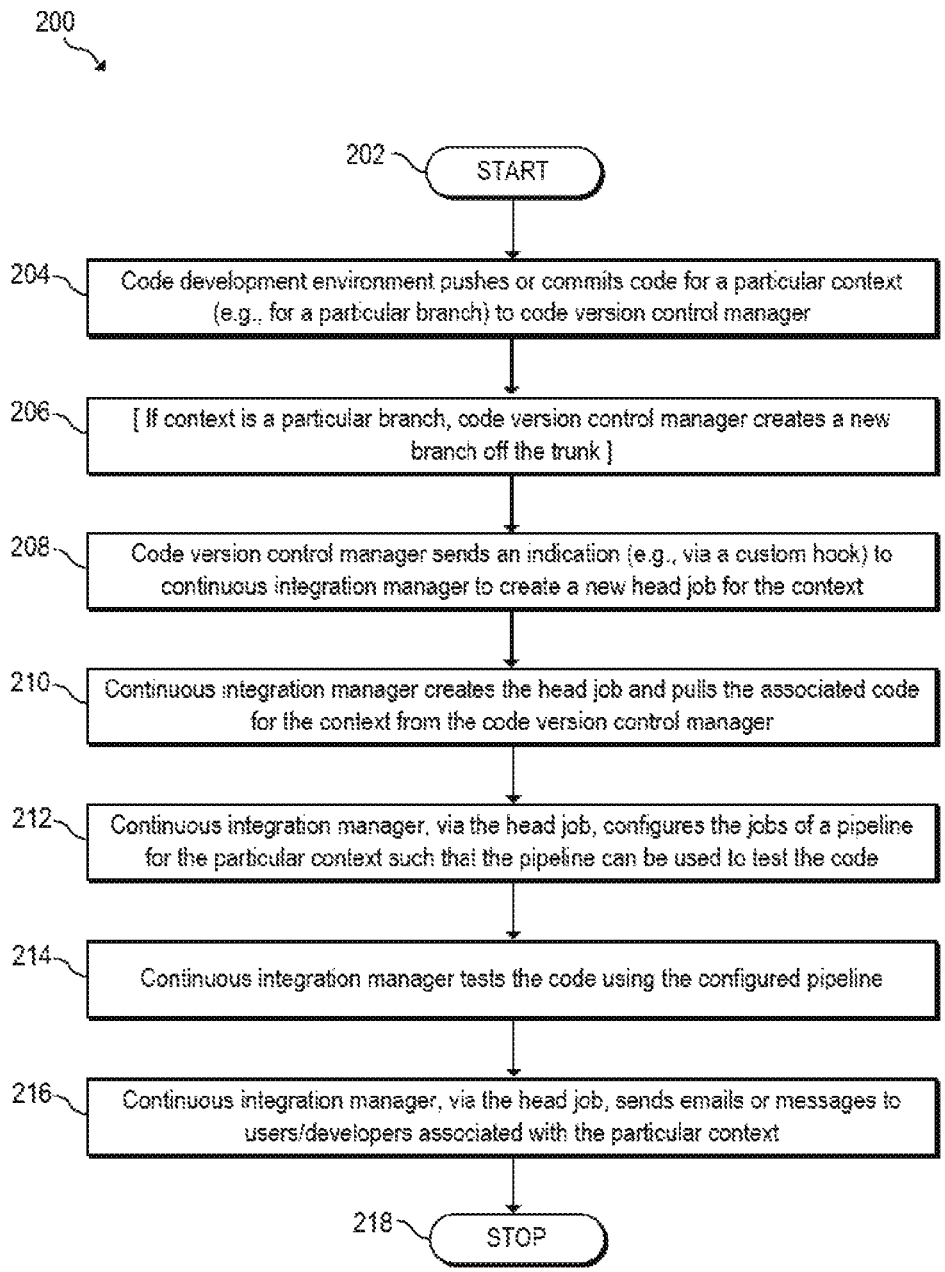
FIG. 2 is a flowchart of an example method for continuous integration with reusable context aware jobs.

FIG. 2 is a flowchart of an example method 200 for continuous integration with reusable context aware jobs. The execution of method 200 is described below with reference to a code development system (e.g., 102), a code version control manager (e.g., 104) and a continuous integration manager (e.g., 106). As described above, each of these components may be included within a system (e.g., a system with a machine-readable storage medium and a processor). Method 200 may be implemented in the form of executable instructions stored on at least one machine-readable storage medium and/or in the form of electronic circuitry. In alternate embodiments of the present disclosure, one or more steps of method 200 may be executed substantially concurrently or in a different order than shown in FIG. 2. In alternate embodiments of the present disclosure, method 200 may include more or less steps than are shown in FIG. 2. In some embodiments, one or more of the steps of method 200 may, at certain times, be ongoing and/or may repeat.

Method 200 may start at step 202 and may continue to step 204, where a code development environment (e.g., 102) may push or commit code for a particular context (e.g., for a particular branch or a particular application) to a code version control manager (e.g., 104). At step 206, if the context mentioned above is that the code is for a particular branch, the code version control manager may create a new branch of a main trunk. At step 208, code version control manager 104 may send an indication, for example, via a custom hook (e.g., in 108), to a continuous integration manager (e.g., 106) to create a new head job for the context. At step 210, the continuous integration manager may create the head job, and the head job may pull the associated code for the context from the code version control manager. At step 212, the continuous integration manager, via the head job, may configure the jobs of a pipeline. The jobs may be configurable and may be configured for the particular context such that they can be used to test the code. At step 214, the continuous integration manager may test the code using the configured pipeline. At step 216, the continuous integration manager, via the head job, may send at least one email or message to at least one user or developer associated with the particular context (e.g., with the particular branch or application). Method 200 may eventually continue to step 218, where method 200 may stop.

Figure 3:
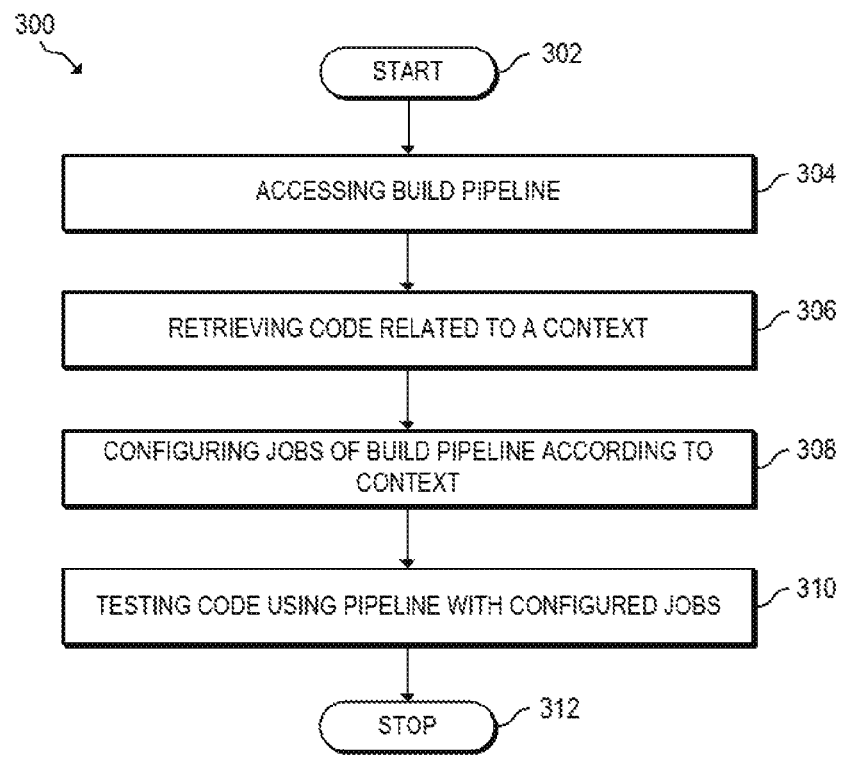
FIG. 3 is a flowchart of an example method for continuous integration with reusable context aware jobs.

FIG. 3 is a flowchart of an example method 300 for continuous integration with reusable context aware jobs. Method 300 may be described below as being executed or performed by a continuous integration system, for example, continuous integration system 500 of FIG. 5. Other suitable systems may be used as well, for example, a continuous integration system that includes continuous integration manager 105 shown in FIG. 1. Method 300 may be implemented in the form of executable instructions stored on at least one machine-readable storage medium of the continuous integration system, and/or in the form of electronic circuitry. In alternate embodiments of the present disclosure; one or more steps of method 300 may be executed substantially concurrently or in a different order than shown in FIG. 3. In alternate embodiments of the present disclosure, method 300 may include more or less steps than are shown in FIG. 3. In some embodiments, one or more of the steps of method 300 may, at certain times, be ongoing and/or may repeat.

Method 300 may, start at step 302 and continue to step 304, where a continuous integration system may access a build pipeline that includes multiple jobs that are reusable and configurable. At step 306, the system may retrieve a version of code for a software application, where the version of code is related to a context. At step 308, the system may configure the jobs of the build pipeline according to the context. At step 310; the system may test the version of code using the build pipeline with the configured jobs. Method 300 may eventually continue to step 312, where method 300 may stop.

Figure 4:
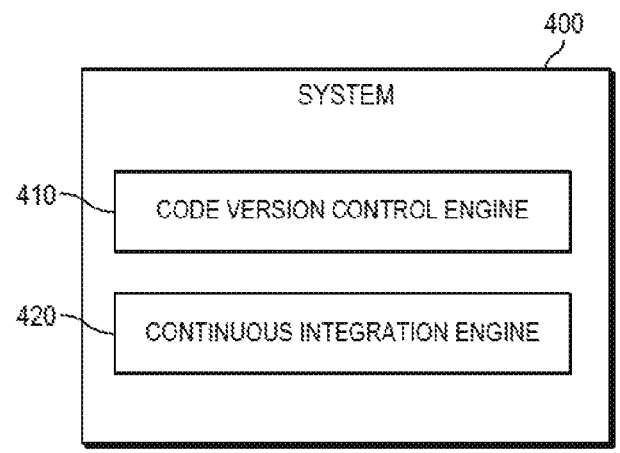
FIG. 4 is a block diagram of an example system for continuous integration with reusable context aware jobs.

FIG. 4 is a block diagram of an example system 400 for continuous integration with reusable context aware jobs. System 400 may include any number of computing devices, e.g., computing devices that are capable of communicating with each other over a network. In the embodiment of FIG. 4, system 400 includes a code version control engine 410 and continuous integration engine 420. Code version control engine 410 may be similar to code version control manager 104 of FIG. 1. Code version control engine 410 includes one or more hardware devices including electronic circuitry for implementing the functionality of code version control engine 410. Code version control engine 410 may also include a series of instructions executable by the one or more hardware devices of code version control engine 410. Code version control engine 410 may launch a custom hook when a code development environment commits a version of code to the code version control engine 410, where the version of code is related to a context.

Continuous integration engine 420 may be similar to continuous integration manager 106 of FIG. 1. Continuous integration engine 420 includes one or more hardware devices including electronic circuitry for implementing the functionality of continuous integration engine 420. Continuous integration engine 420 may also include a series of instructions executable by the one or more hardware devices of continuous integration engine 420. Continuous integration engine 420 may maintain a build pipeline that includes multiple jobs that are reusable and configurable. Continuous integration engine 420 may receive an indication from the code version control engine in response to the custom hook being launched indicating. Continuous integration engine 420 may configure the jobs of the build pipeline according to the context based on the indication. Continuous integration engine 420 may test the version of code using the build pipeline with the configured jobs.

Figure 5:
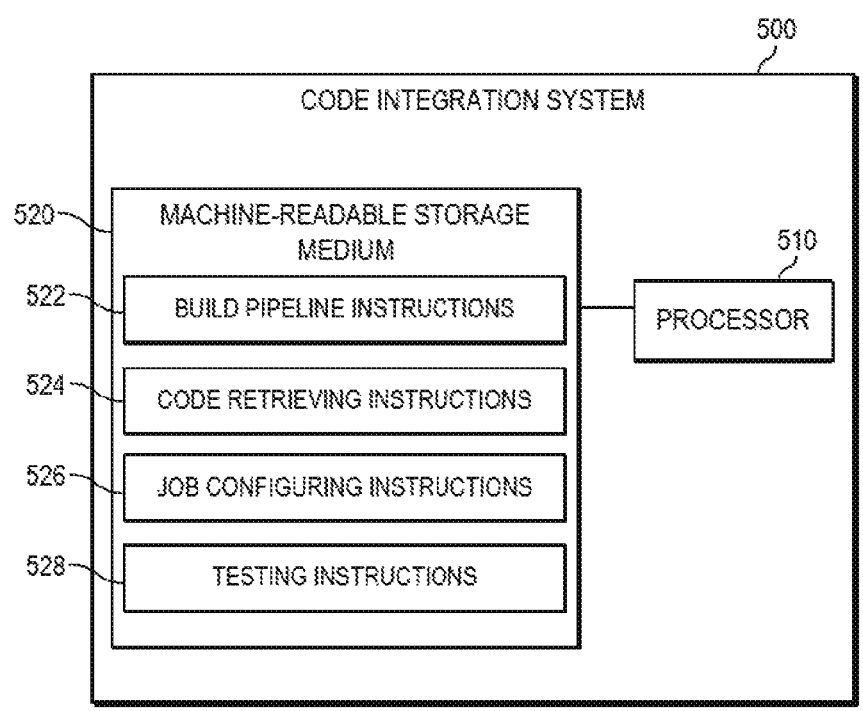
FIG. 5 is a block diagram of an example code integration system for continuous integration with reusable context aware jobs.

FIG. 5 is a block diagram of an example code integration system 500 for continuous integration with reusable context aware jobs. System 500 may be similar to a system that includes continuous integration manager 106 of FIG. 1, for example. In the embodiment of FIG. 5, system 500 includes a processor 510 and a machine-readable storage medium 520.

Processor 510 may be one or more central processing units (CPUs), microprocessors, and/or other hardware devices suitable for retrieval and execution of instructions stored in machine-readable storage medium 520. In the particular embodiment shown in FIG. 5; processor 510 may fetch, decode, and execute instructions 522, 524, 526, 528 to facilitate continuous integration with reusable context aware jobs. As an alternative or in addition to retrieving and executing instructions, processor 510 may include one or more electronic circuits comprising a number of electronic components for performing the functionality of one or more of instructions in machine-readable storage medium 520. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Machine-readable storage medium 520 may be any electronic, magnetic, optical; or other physical storage device that stores executable instructions. Thus, machine-readable storage medium 520 may be, for example, Random Access Memory (RAM), an Electrically-Erasable Programmable Read-Only Memory (EEPROM), a storage drive, an optical disc, and the like. Machine-readable storage medium 520 may be disposed within system 500, as shown in FIG. 5. In this situation, the executable instructions may be "installed" on the system 500. Alternatively, machine-readable storage medium 520 may be a portable, external or remote storage medium, for example, that allows system 500 to download the instructions from the portable/external/remote storage medium. In this situation, the executable instructions may be part of an "installation package". As described herein, machine-readable storage medium 520 may be encoded with executable instructions for continuous integration with reusable context aware jobs.

Referring to FIG. 5, build pipeline accessing instructions 522, when executed by a processor (e.g., 510), may access a build pipeline that includes multiple jobs that are reusable and configurable. Code retrieving instructions 524, when executed by a processor (e.g., 510), may retrieve a version of code for a software application, where the version of code is related to a context. Job configuring instructions 526, when executed by a processor (e.g., 510), may configure the jobs of the build pipeline according to the context. Testing instructions 528, when executed by a processor (e.g., 510), may test the version of code using the build pipeline with the configured jobs.

The invention claimed is:

1. A method comprising:
 a processor retrieving a version of code, wherein the version of code is related to a context;
 the processor detecting an event corresponding to creation of a branch;
 the processor automatically, in response to detecting the event, configuring a plurality of jobs of a build pipeline for testing the version of code, wherein each job of the plurality of jobs is reusable and configurable and the processor configuring the plurality of jobs comprises:
  creating a head job other than the plurality of jobs; and
  executing the head job to configure the plurality of jobs according to the context, including providing a parameter to configure a first job of the plurality of jobs; and
 the processor testing the version of code using the build pipeline with the configured plurality of jobs.

2. The method of claim 1, wherein the context is the version of code being a particular branch off a main trunk of a software application or being the software application.

3. The method of claim 1, wherein the detecting comprises receiving an indication of the event from a version control manager.

4. The method of claim 1, wherein the configuring further includes wrapping the plurality of jobs of the build pipeline in context wrappers that are associated with the context.

5. The method of claim 4, wherein each context wrapper of the context wrappers comprises a one by one matrix.

6. The method of claim 1, further comprising sending an email or a message regarding a status of the testing of the version of code, wherein the email or the message is only sent to users associated with the context, excluding users associated with other contexts.

7. The method of claim 6, wherein the email or the message includes a visual representation of the build pipeline as it pertains to the context.

8. A system, comprising:
a processor; and
a memory to store instructions that, when executed by the processor, cause the processor to:
launch a custom hook when a code development environment commits a version of code to the version of code, wherein the version of code is related to a context;
maintain a build pipeline that includes multiple jobs that are reusable and configurable;
receive an indication in response to the custom hook being launched;
in response to the indication, configure the multiple jobs of the build pipeline according to the context based on the indication, wherein configuring the multiple jobs comprises creating a head job other than the multiple jobs and executing the head job to configure the multiple jobs according to the context, including providing a parameter to configure a first job of the multiple jobs; and
test the version of code using the build pipeline with the configured multiple jobs.

9. The system of claim 8, wherein the instructions, when executed by the processor, further cause the processor to provide a graphical user interface (GUI) to display status of the testing by displaying status for the configured configured multiple jobs.

10. The system of claim 8, wherein the instructions, when executed by the processor, further cause the processor to retrieve the version of code based on the indication, wherein the indication includes a repository where the version of code is stored.

11. A machine-readable storage medium encoded with instructions for continuous integration, the instructions being executable by a processor of a system, and the instructions comprising:
build pipeline accessing instructions to access a build pipeline that includes multiple jobs that are reusable and configurable;
code retrieving instructions to retrieve a version of code for a software application, wherein the version of code is related to a context;
job configuring instructions to configure the jobs of the build pipeline according to the context, including providing a parameter to configure a first job of the jobs;
testing instructions to test the version of code using the build pipeline with the configured jobs; and
create a head job that is related to the context, wherein the head job is used to configure the jobs of the build pipeline according to the context, and wherein the head job is automatically created in response to an indication from a version control manager.

12. The machine-readable storage medium of claim 11, further comprising build history generating instructions to generate a build history related to the version of code, wherein the build history is filterable to show only build history information related to the context and to hide a build history information associated with other contexts.

13. The method of claim 1, wherein:
the context identifies the branch; and
the testing comprises testing the branch.

14. The method of claim 1, wherein the context associates the build pipeline with a particular branch of an application.

15. The method of claim 1, wherein the context associates the build pipeline with an application.

16. The method of claim 1, wherein:
the detecting comprises executing a hook of the version of code;
the executing the hook causes metadata to be sent to the head job; and
the metadata comprises configuration information for the plurality of jobs.

* * * * *